UNITED STATES PATENT OFFICE.

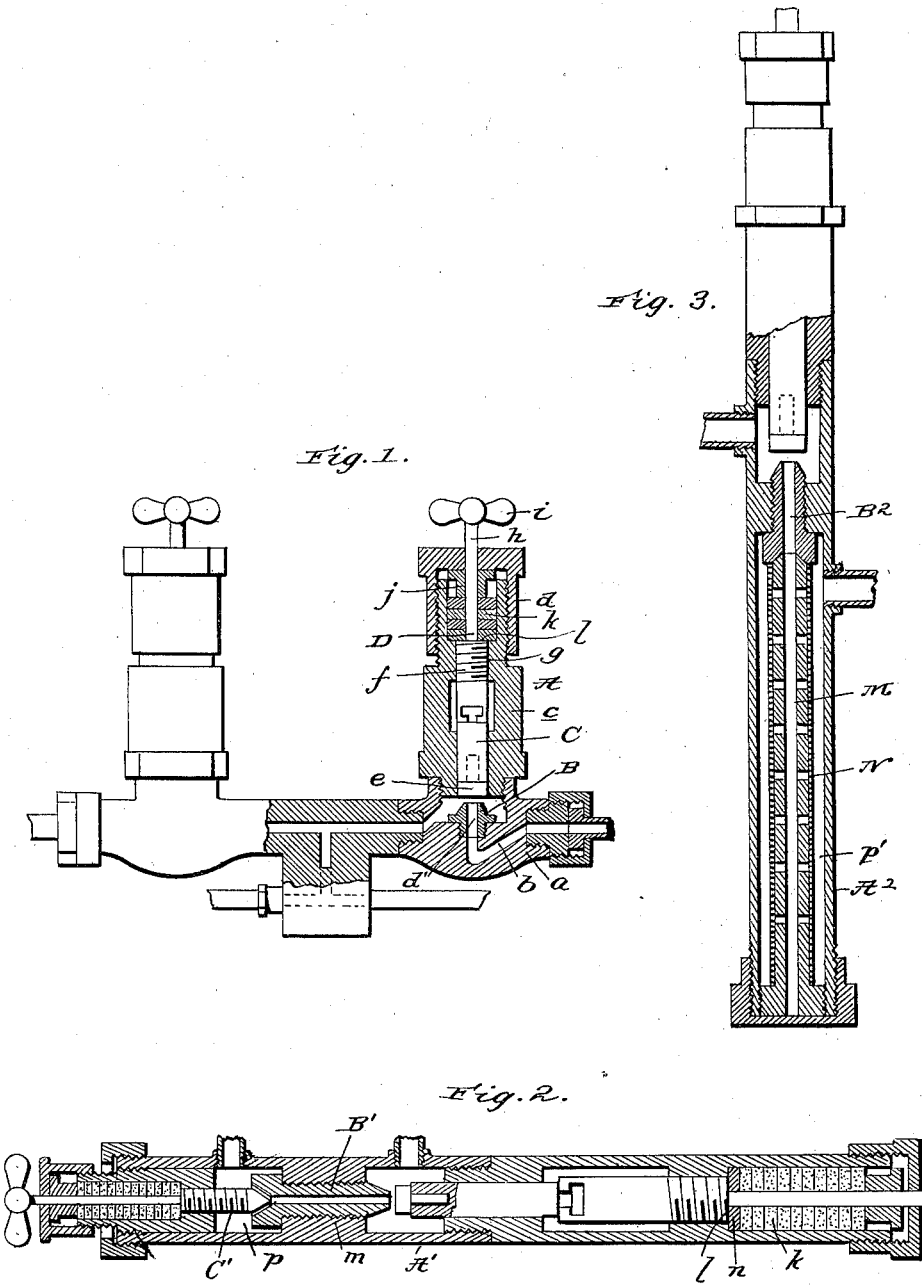

CHARLES D. P. GIBSON, OF JERSEY CITY, NEW JERSEY.

RECIPROCATING VALVE.

SPECIFICATION forming part of Letters Patent No. 655,928, dated August 14, 1900.

Application filed July 18, 1899. Serial No. 724,269. (No model.)

*To all whom it may concern:*

Be it known that I, CHARLES D. P. GIBSON, a citizen of the United States, residing at Jersey City, in the county of Hudson and State of New Jersey, have invented new and useful Improvements in Reciprocating Valves, of which the following is a specification.

My invention relates to valves of the reciprocating type and contemplates the provision of valves which, while designed more particularly for use in the carbonic-acid-gas motor disclosed in my contemporary application, filed May 25, 1899, Serial No. 718,214, are calculated to be used to advantage in other connections.

The valves are constructed with a view of effectually preventing the passage of carbonic-acid gas through the conduits controlled by the valves when said valves are closed and also with a view of precluding leakage of the carbonic-acid gas or other fluid pressure from the valve-casings when the valves are open.

With the foregoing in mind the invention will be fully understood from the following description and claims when taken in conjunction with the accompanying drawings, in which—

Figure 1 is a vertical section of a cock or valve constructed in accordance with my invention. Fig. 2 is a similar view of a throttle-valve embracing the invention. Fig. 3 is a vertical section of a modified form of cock or valve.

Referring by letter to the said drawings and more particularly to Fig. 1 thereof, A is the casing of my improved valve. This casing in the preferred embodiment of the invention is made up of a body $a$, having a port or passage $b$, a bonnet $c$, detachably connected by screw-threads to the body, and a gland $d$, screwed on the outer end of the bonnet. B is a nipple, preferably of hard metal, which is connected by screw-threads to the casing-body $a$ and has a port $d'$ coincident with that of said body $a$ and also has its outer end more or less beveled, so as to better enable it to serve as a valve-seat, and C is a reciprocatory valve-body of angular form in transverse section, which is arranged and adapted to move endwise in the correspondingly-shaped interior of the bonnet $c$, and is thereby held against rotary movement incident to its endwise movement. This valve-body C is provided at its inner end with a removable face $e$ of a metal softer than the nipple B, which is adapted to be engaged by said nipple when the valve is closed, so as to preclude the passage of carbonic-acid gas or other fluid pressure through the valve. D is a valve-stem which is connected at its inner end in a swiveled manner to the outer end of the valve-body C. The said stem is made up of an inner larger portion $f$, which is threaded to engage interior threads $g$ of the bonnet $c$, and an outer reduced portion $h$, which extends loosely through the gland $d$ and is provided with a suitable handle $i$. When the handle $i$ is turned to close the valve, the valve-body C is moved rectilinearly with considerable force down upon the nipple B, with the result that said nipple penetrates the softer metal face $e$ of the body and effects an extremely-tight closure, which precludes the passage of fluid-pressure through the valve. The valve-body C being held against rotation, the nipple B takes into the face $e$ thereof at the same place incident to each seating of the valve. By virtue of this but little effort is required to tightly close the valve, and the joint between the nipple B and softer metal face $e$ is always broken, which assists in preventing leakage of fluid-pressure when the valve is closed.

In order to effectually prevent the leakage of carbonic-acid gas or other fluid from the casing A when the valve is open, I provide within the casing-bonnet $c$ and upon the reduced portion $h$ of the valve-stem a metallic collar $j$ and a plurality of superposed washers $k$, of felt or other compressible material, the latter being interposed between the collar $k$ and a shoulder $l$ of the valve-stem, as shown. By virtue of this provision when the valve is opened the shoulder $l$ of the valve-stem compresses the washers $k$ and expands or spreads the same against the interior of the bonnet, and consequently enables said washers to effectually prevent the passage of gas or other fluid pressure.

Notwithstanding the material advantages which it possesses, it will be appreciated that the valve described is extremely simple and is calculated to last for a long time. It will also be appreciated that the nipple B and face e, which are the only parts subject to wear, may be readily removed and replaced by new ones, so as to prolong the usefulness of the valve for an indefinite period of time.

The throttle-valve shown in Fig. 2 is similar to the valve shown in Fig. 1, with the exception that its nipple or valve-seat B' is secured by screw-threads in a partition $m$ of a casing A' and a metallic washer $n$ is interposed between the shoulder $l$ of its stem and the adjacent felt washer $k$. The washer $n$ is provided because of the frequency with which the throttle-valve is opened and closed in practice, its purpose being to prevent wear of the felt washer adjacent to the shoulder of the valve-stem. It is necessary to increase or diminish the size of the passage through the throttle-valve, according to the pressure of the carbonic-acid gas or other fluid which the valve is designed to control. To this end I provide the auxiliary valve or valve proper C', which is arranged in the casing A' of the throttle-valve and is packed with compressible washers in substantially the same manner as said throttle-valve in order to preclude leakage of gas when it is opened. By virtue of the provision of the said auxiliary valve C', which is arranged to seat in the inner flared end of the nipple B', the operator is enabled to readily regulate the size of the passage between the bore of the nipple and the chamber $p$ at one side of the partition $m$, so as to permit the passage of a proper pressure. For instance, if the pressure is very high the operator has but to turn the valve C' inwardly in order to supply the proper pressure to an engine, and he is also enabled, as the pressure is reduced, to gradually increase the size of the passage between the chamber $p$ and the bore of the nipple B'. Said valve C' renders the alternate employment of nipples B' with bores of different sizes unnecessary and will therefore be appreciated as an important feature of my invention.

In the valve shown in Fig. 3 the chamber $p'$ in the casing $A^2$ is of considerable length, and the nipple $B^2$ is disposed above a foraminated tube M, removably secured in the casing and surrounded by a screen N of wire-gauze. The purpose of this screen is to prevent dust, grit, or any other impurity or foreign substance that may be present in the gas from reaching the valve-seat. The tube M and screen N being removably secured in the casing $A^2$ it follows that they may be readily removed when it is necessary to clear the screen of the impurities which it has collected.

Having thus described my invention, what I claim is—

1. A valve comprising a casing having chambers and a port connecting said chambers, a throttle-valve arranged in one of the chambers so as to control the port, and an auxiliary, regulating-valve, movable independent of the throttle-valve, for controlling communication between the other chamber and the port, substantially as specified.

2. A reciprocating valve comprising a casing having a partition, a nipple extending through and removably secured in the partition and having valve-seats at its opposite ends, and valves proper arranged at opposite sides of the partition and adapted to engage the opposite ends of the nipple, substantially as specified.

3. A reciprocating valve comprising a casing having a partition, a nipple secured by screw-threads in the partition and having valve-seats at its opposite ends, a rectilinearly-movable valve-body arranged in and held against turning by the casing, a stem connected in a swiveled manner to the valve-body and having a shoulder and also having threads designed to engage corresponding threads in the casing, one or more compressible washers surrounding the stem and interposed between the casing and the shoulder of said stem, an auxiliary valve disposed at the opposite side of the partition with respect to the said valve-body, and compressible washers surrounding the auxiliary valve and interposed between a shoulder thereof and a casing, substantially as specified.

In testimony whereof I have hereunto set my hand in presence of two subscribing witnesses.

CHARLES D. P. GIBSON.

Witnesses:
CARL LUCK,
HARRY SHICK.